United States Patent
Baechtle et al.

(10) Patent No.: US 8,251,783 B2
(45) Date of Patent: Aug. 28, 2012

(54) APPARATUS AND METHOD FOR A SAUSAGE-CASING-SENSITIVE DIVISION OF STUFFED SAUSAGE STRANDS

(75) Inventors: Manfred Baechtle, Schemmerhofen (DE); Juergen Flach, Obermarchtal (DE); Wolfgang Braig, Laupheim (DE); Juergen Bochtler, Aepfingen (DE); Jochen Merk, Biberach (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 208 days.

(21) Appl. No.: 12/633,076

(22) Filed: Dec. 8, 2009

(65) Prior Publication Data

US 2010/0190425 A1     Jul. 29, 2010

(30) Foreign Application Priority Data

Jan. 28, 2009   (EP) ..................... 09001166

(51) Int. Cl.
*A22C 11/00* (2006.01)
*A22C 11/10* (2006.01)
(52) U.S. Cl. ............... 452/48; 452/46; 452/51
(58) Field of Classification Search .............. 452/46–48, 452/51
See application file for complete search history.

(56) References Cited

U.S. PATENT DOCUMENTS

| | | | | |
|---|---|---|---|---|
| 1,179,543 A * | 4/1916 | Mayer | | 452/47 |
| 1,459,069 A * | 6/1923 | Kruse | | 452/46 |
| 1,743,858 A * | 1/1930 | Kruse | | 452/47 |
| 1,866,497 A * | 7/1932 | Allen et al. | | 452/47 |
| 2,183,687 A * | 12/1939 | Miller | | 452/47 |
| 2,229,590 A * | 1/1941 | Popp | | 452/47 |
| 3,152,358 A * | 10/1964 | Millenaar | | 452/46 |
| 3,208,098 A * | 9/1965 | Heydn | | 452/46 |
| 3,228,060 A * | 1/1966 | Heydn | | 452/46 |
| 3,435,482 A * | 4/1969 | Ziolko | | 452/47 |
| 4,104,763 A | 8/1978 | Tetsuro | | |
| 4,129,923 A * | 12/1978 | Hoegger | | 452/46 |
| 5,145,451 A | 9/1992 | Staudenrausch | | |
| 5,618,229 A * | 4/1997 | Le Paih | | 452/47 |
| 6,050,888 A | 4/2000 | Nakamura et al. | | |
| 6,468,144 B1 * | 10/2002 | Michaud et al. | | 452/46 |
| 6,688,959 B2 * | 2/2004 | Kasai et al. | | 452/30 |

FOREIGN PATENT DOCUMENTS

| | | |
|---|---|---|
| DE | 2054441 A1 | 5/1972 |
| DE | 2302297 A1 | 7/1974 |
| EP | 0472825 A1 | 3/1992 |
| EP | 1902622 A1 | 3/2008 |
| GB | 2076629 A | 12/1981 |

OTHER PUBLICATIONS

European Search Report for 09001166 dated Mar. 11, 2009.

* cited by examiner

*Primary Examiner* — David Parsley
(74) *Attorney, Agent, or Firm* — Marshall, Gerstein & Borun LLP

(57) ABSTRACT

An apparatus for a sausage-casing-sensitive division of stuffed sausage strands, having at least one pair of dividing elements for dividing the stuffed sausage strand and at least two guide elements between which the stuffed sausage strand is conveyed in the conveying direction. The distance between the guide elements can be adjusted in dependence upon the sausage caliber.

14 Claims, 10 Drawing Sheets

APPARATUS AND METHOD FOR A SAUSAGE-CASING-SENSITIVE DIVISION OF STUFFED SAUSAGE STRANDS

CROSS-REFERENCE TO RELATED APPLICATION

The present application claims the benefit of priority of European Patent Application No. 09001166.9, filed Jan. 28, 2009. The entire text of the priority application is incorporated herein by reference in its entirety.

FIELD OF THE DISCLOSURE

The present disclosure relates to an apparatus for a sausage-casing-sensitive division of stuffed sausage strands as well as to a corresponding method.

BACKGROUND

The systems used in sausage production processes are, inter alia, constant-stuffing type systems. In these systems the ejection of stuffing material is not stopped during the division process, and the casing is removed permanently from the stuffing tube. The division of the strand into individual positions is effected by constricting the stuffed sausage strand with dividing elements.

Such an apparatus is known e.g. from U.S. Pat. No. 6,050,888. The continuously stuffed sausage strand is divided with the aid of a rotating transport element, e.g. a chain or a toothed belt. To this end, dividing elements and guide elements are provided at equal spacings on the transport element. The dividing elements engage the stuffed sausage strand in pairs and constrict the same so as to produce a portion.

In order to produce sausages of different calibers, a different pair of chains is used when the free space between the sausage and the non-adjustable guide elements becomes excessively large or small. It turned out that, if this is not done, the casing will frequently burst due to high mechanical loads, especially when the casings used are natural casings. A sausage-casing-sensitive division is here not possible, especially not for different sausage calibers.

Another production possibility is described in EP 0 472 825, as shown in FIG. 14. A conveyor belt is here provided after a flexible pair of dividing elements. The removal belts have the function of catching the sausages and of transporting them away, since the location of division is produced between the dividing elements and the belts. The problem arising here is that the delicate natural casings may burst in an area of the dividing elements. This embodiment is also disadvantageous insofar as the two systems for producing products of equal lengths are arranged in succession. This has the effect that, especially when natural casings are being processed (curvature ("Kranzigkeit"), tendency to swerve from a theoretically existing stuffing axis), transfer problems from the first to the second unit will arise, viz. due to lack of guidance (unbalance).

Also a dividing system for substantially constant sausage calibers is already known from EP 1 902 622, as can be seen in FIG. 15.

SUMMARY OF THE DISCLOSURE

Starting from this prior art, it is an aspect of the present disclosure to provide an apparatus and a method by means of which especially natural casings can be partitioned and guided very gently.

In accordance with the present disclosure, the distance between the guide elements can be adapted to the sausage caliber. A guide element is here an element which holds and guides the sausage strand essentially on the longitudinal axis of the apparatus in the conveying direction so that the not yet fully stuffed sausage strand can rotate between the guide means about its longitudinal axis. Due to the fact that the guide elements are displaceable, an optimum ratio of the sausage caliber to the distance between the guide elements can always be adjusted. If the distance between the guide elements were too small, the not yet fully stuffed sausage, which is caused to rotate by the stuffing tube, would not be able to rotate unhindered together with said stuffing tube, and this would lead to incorrect twist-off locations or to a bursting of the casing. If the distance were too large, the casing would tend to cause, due to its curvature, out-of-balance phenomena during the twist-off process. This may have the effect that the sausage knocks against the support elements and bursts, or length variations may occur when the sausages swerve to the side. It follows that the present disclosure allows optimum guidance of the sausage strand and, consequently, a sausage-casing-sensitive production in the case of different sausage calibers, especially in cases where the sausage caliber and the length of the individual portions vary.

According to an advantageous embodiment, the guide elements and the dividing elements are arranged in a spatially overlapping manner. The spatially overlapping mode of arrangement provides the advantage that the sausage strand can be supported when it is being divided and constricted with the aid of the dividing elements. A sausage-casing-sensitive production can be accomplished in this way. Due to the spatially overlapping mode of arrangement, the dividing device can be arranged very close to the stuffing tube, so that the sausage strand can already be supported immediately after the ejection of the paste-like substance.

According to an advantageous embodiment, the distance between the guide elements is adjustable such that it is larger than the sausage caliber. As has already been explained hereinbefore, this has the effect that the not yet fully stuffed sausage, which is caused to rotate and which is already provided with a twist-off point at the front end thereof and has not yet been partitioned towards the stuffing tube, can co-rotate unhindered, and that out-of-balance phenomena can be prevented. The distance a between a sausage strand arranged at the center M of the guide elements and said guide elements is 0.5 to 5 mm, preferably 0.5 to 2 mm.

According to an advantageous embodiment, the location of division is produced in an area between the guide elements. Due to the fact that the location of division is produced in the area between the guide elements, it can be guaranteed that the sausage strand is effectively guided during the division process. In addition, this arrangement allows the apparatus to be positioned as close as possible to the ejection end of the stuffing tube. It follows that, as has already been mentioned, the sausage strand can be guided gently immediately after the stuffing tube.

Depending on the respective caliber, the distance between the guide elements and the ejection end of the stuffing tube is preferably within a range of less than 10 mm.

According to a preferred embodiment, the at least two guide elements comprise at least two opposed guide strips which extend in the conveying direction and which are preferably synchronously displaceable in the direction of the center M of the guide elements, i.e. the guide elements are here stationary and are not of the co-running type. These guide strips, which extend in the conveying direction, can be adjusted in dependence upon the respective sausage caliber thus allowing a large caliber range without any necessity of exchanging format parts. This kind of guide elements or guide strips are independent of the dividing elements so that it will also be possible to produce different lengths.

According to a preferred embodiment, the apparatus includes at least two opposed circulating elements, such as belts or chains, which each comprise at least one dividing element, the guide strips being arranged such that the pairs of dividing elements are adapted to be moved in the conveying direction T between said guide strips without contacting the same. This is a very space-saving arrangement which allows the dividing elements to move as close as possible along the guide strip while the strand is being constricted. The guide strips can therefore be positioned as close as possible to the nozzle. The product is guided as early as possible during the twist-off process and this, in turn, will lead to a mode of production in which the sausage casing and the product are processed gently. It is also possible to arrange a plurality of guide strips, especially four guide strips, around the center M.

According to a further embodiment of the present disclosure, the guide elements are not static, but they are implemented as co-running elements. When the guide elements are implemented as co-running elements, they may also fulfil a conveying function for the stuffed sausage strand. It will then be necessary that, in an area of the guide elements constituting the front area when seen in the conveying direction and having a length that corresponds approximately at least to the length of the sausage to be produced □ 10%, the guide elements are spaced apart in such a way that the sausage strand can rotate freely between the guide elements. Further down in the conveying direction, said distance decreases such that the sausages are caught so that they can be conveyed, i.e. the opposed guide elements can e.g. extend parallel to one another or at an angle to one another, i.e. they can be conically adjustable. However, the guide elements may also be configured as freely co-running elements, i.e. said guide elements, provided e.g. in the form of a belt, a chain or a drum, co-rotate freely about at least one axis, when said sausage strand is moved in the conveying direction.

According to an advantageous embodiment, the guide elements comprise V- or U-shaped dogs which are arranged on two opposed circulating parts, in particular on belts or chains. The circulating parts are arranged one on top of the other, but they may also be arranged horizontally. Thus, the dogs will reliably support the stuffed sausage strand.

According to an advantageous embodiment, the dividing elements are then arranged in an area of the guide elements constituting the front end area when seen in the conveying direction T. The front end area is here the area which is arranged as close as possible to the stuffing tube.

The dogs can be implemented such that they are at least partially flexible, i.e. the dogs are implemented such that they are fully made of flexible material or that at least their upper end, i.e. the end facing the circulating part, is flexible enough for being able to give way, if the dogs should collide with a dividing element. It follows that a flexibility with respect to the length of the different products is given. The flexibility with respect to the length of the products is therefore independent of the spacing of the dogs on the circulating part and also independent of the moment at which the dividing elements engage between the dogs.

For covering the largest possible sausage caliber range, the dogs are arranged on the opposed circulating parts such that thy are displaced relative to one another in the conveying direction. This means that the two circulating parts can be positioned very close to one another and can be adjusted to a very small sausage caliber, which is smaller than the sum of the heights of the opposed dogs.

In the present embodiment, the path of movement of the guide elements and the path of movement of the dividing elements intersect in an advantageous manner.

BRIEF DESCRIPTION OF THE DRAWINGS

In the following, the present disclosure will be explained in detail with reference to the following figures.

DETAILED DESCRIPTION OF THE PREFERRED EMBODIMENT

Figure 1:
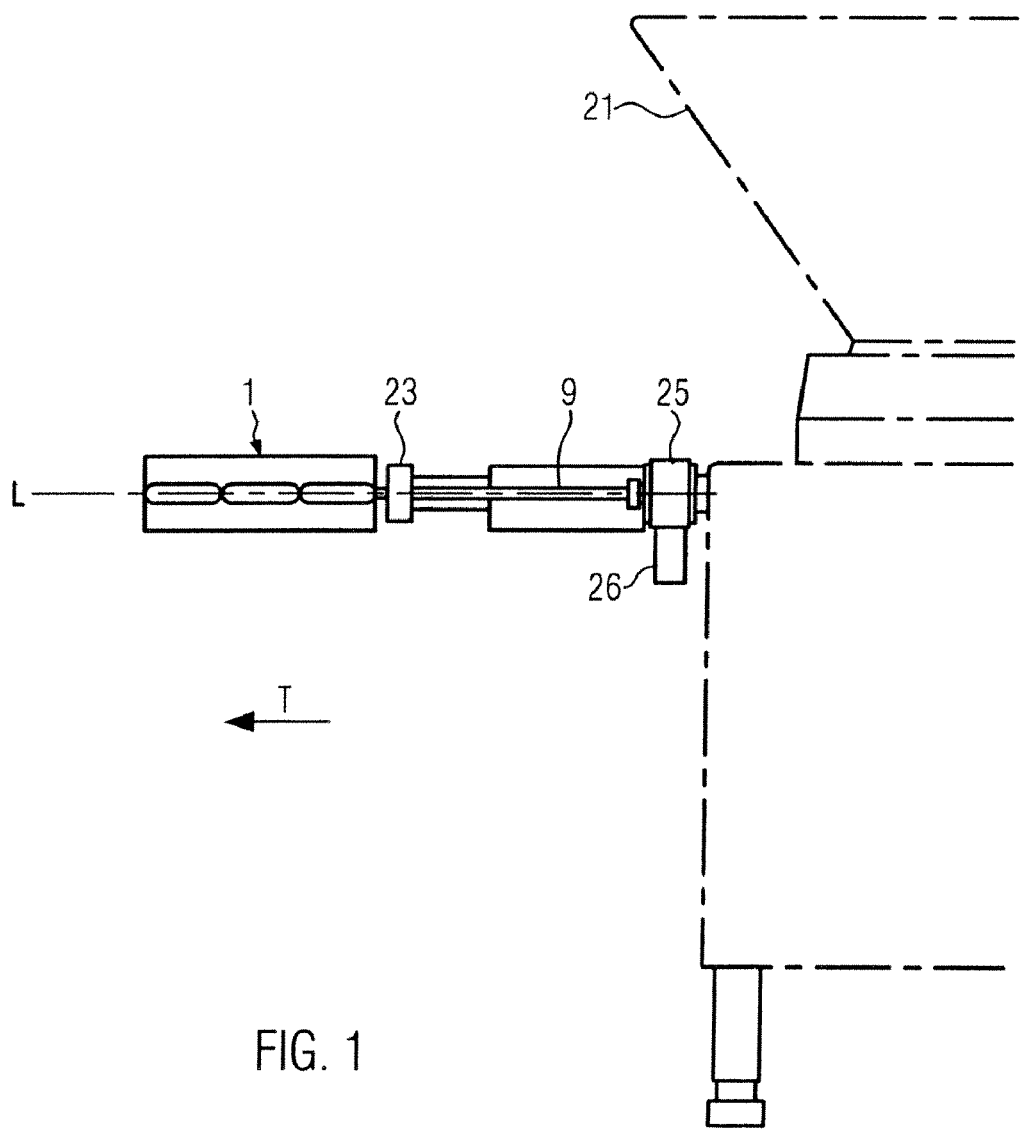
FIG. 1 shows schematically a longitudinal section through an apparatus according to the present disclosure.
Figure 2:
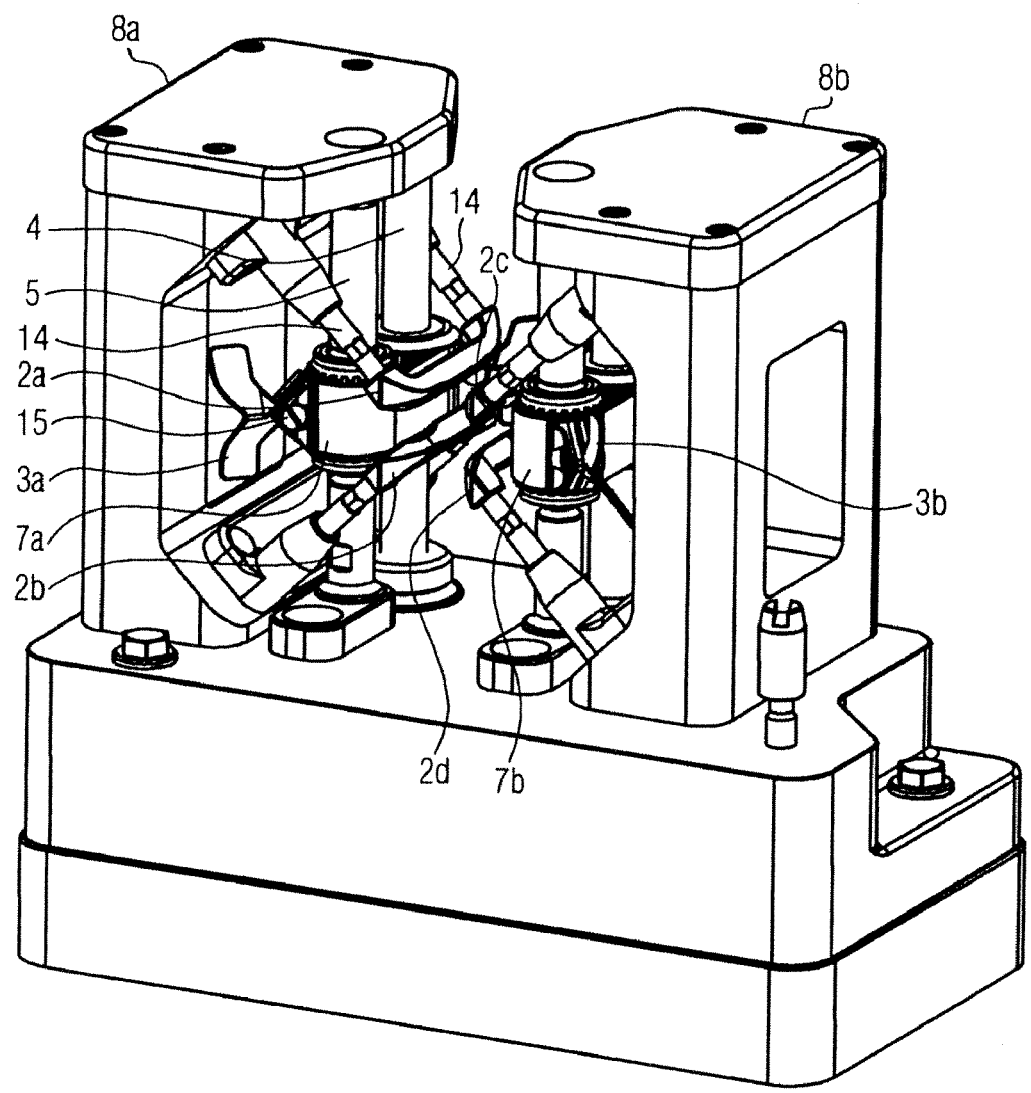
FIG. 2 shows schematically, in a perspective representation, a first embodiment of the present disclosure.

FIG. 1 shows, in a schematic representation, a stuffing machine for producing a stuffed sausage strand 12, which, with the aid of the apparatus 1 according to the present disclosure, is divided into individual sausage strand sections having a predetermined length 1 and a predetermined sausage caliber dk. The stuffing machine comprises, in the manner known, a hopper 21 through which it is filled with a paste-like substance, e.g. sausage meat, said paste-like substance being then pushed into a stuffing tube 9 via a feed system which is not shown. The end of the stuffing tube has attached thereto the casing brake 23. The means provided for twisting off the stuffed sausage strand, is here a twist-off gear unit 25, which is driven by the motor 26. Making use of the twist-off gear unit, the stuffing tube 9, together with the casing positioned thereon, can be rotated about the longitudinal axis L. The longitudinal axis L is here an extension of the stuffing axis.

The paste-like substance is ejected through the stuffing tube 9 into the casing, e.g. the natural casing, positioned on the stuffing tube 9 and held by the casing brake 23, whereby the stuffed sausage strand 12 is produced in the manner known.

The apparatus 1 for dividing off the stuffed sausage strand is positioned directly after the stuffing tube 9, said apparatus 1 being only schematically shown in FIG. 1. The sausage strand is to be divided into individual portions having a predetermined length 1 by means of the apparatus 1.

FIG. 2-5 show a first embodiment of such an apparatus 1 for a sausage-casing-sensitive division of the stuffed sausage strands 12 into individual portions. As can clearly be seen especially from FIG. 3, this embodiment comprises guide elements defined e.g. by four guide strips 2a, b, c, d. The guide strips 2a, b, c, d extend parallel to the longitudinal axis L, when seen in the conveying direction T. The guide faces of the guide strips face the sausage strand, i.e. the center M of the guide strips, which lies here on the longitudinal axis L of the apparatus. The four statically arranged guide strips 2a, b, c, d extend at an angle of approx. 90° to one another, two respective opposed guide strips 2a and 2b as well as 2c and 2d being arranged on the left and on the right hand side of the longitudinal axis L. The guide strips are rounded at their ends so as to prevent the stuffed sausage strand from being injured. The guide strips are secured to a respective housing 8a, 8b through suitable holders 8a, 8b.

The apparatus additionally comprises at least two opposed circulating elements 7a, b, which are arranged laterally of and in symmetry with the longitudinal axis L. The circulating elements 7a, b are implemented e.g. as belts or chains. The circulating element is driven by a drive shaft 4 and it runs around a deflection shaft 5. Each of the circulating elements is provided with at least one dividing element 3a, b. In the present embodiment, they are provided with two dividing elements, the respective dividing elements 3a, b of the opposed circulating elements 7a, b defining together a dividing element pair which constricts the stuffed sausage strand. As can especially be seen from FIG. 3, the dividing elements 3a, b are able to interengage and to move then along with the sausage strand in the conveying direction T at a speed that is synchronous with the stuffing material ejection speed, independently of the guide elements, and to swivel away from the divided sausage strand at the rear end of the apparatus.

Figure 3:
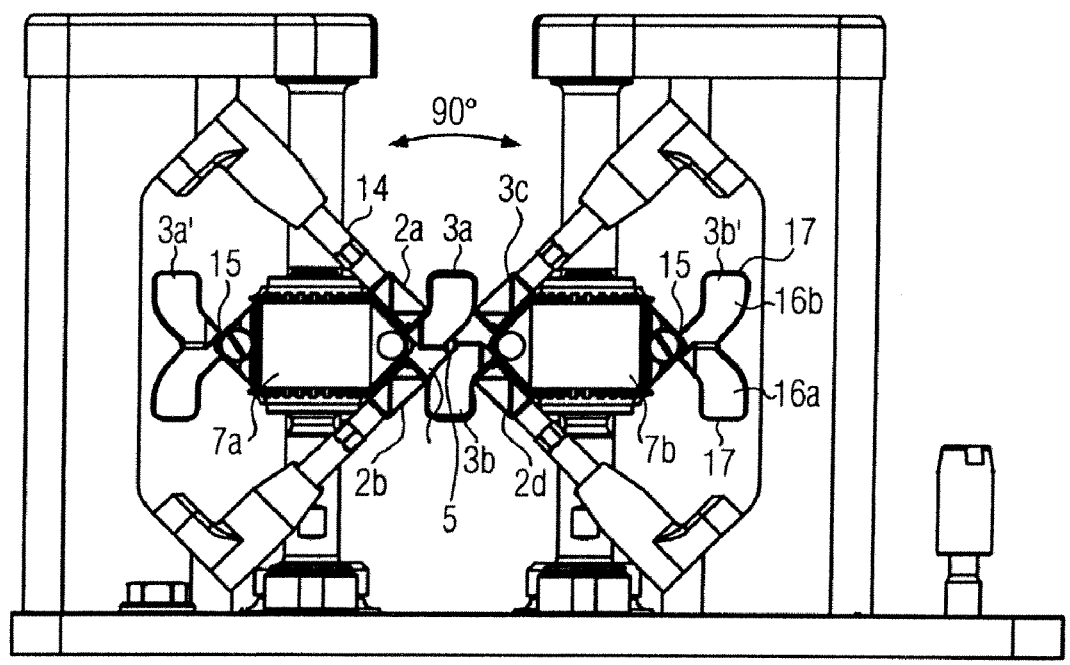
FIG. 3 shows, in a schematic representation, a front view of the apparatus shown in FIG. 2.

As can especially be seen from FIG. 3, the two vanes 16a, b of a dividing element 3 do not extend in one plane, but they first diverge at a specific angle. The end portions 17 of the vanes 16a, b are then curved in such a way that they extend in one plane. As can be seen from FIG. 3, the two dividing elements are arranged such that they will interengage when they are moved towards each other through the circulating elements 7a, b. The dividing elements may, however, also be implemented such that they slide past one another and constrict the sausage strand in this way.

In the present embodiment, the dividing elements extend between the opposed and/or superimposed guide strips 2a, b, c, d. The dividing elements are substantially Y-shaped so that the narrow portion 15 can also pass between guide strips 2a, b which are arranged very close to one another, i.e. the guide strips 2a, b, c, d are geometrically designed such that, while constricting the sausage strand, the dividing elements can move as close as possible along the guide strips without contacting the same. Hence, the guide strips 2a, b, c, d can be positioned as close as possible to the end of the stuffing tube. This has the effect that, during the twist-off process, the product will be constricted and guided as early as possible and that a production mode is accomplished in which the casing and the product are processed gently. As can especially be seen from FIG. 5, the location of division lies in area between the guide elements 2a, b, c, d. The distance s between the guide elements and the stuffing tube 9 is very small and lies, depending on the respective caliber, in a range of less than 10 mm.

In order to guarantee a gentle division especially in the case of natural casings, the distance between the guide elements can be adjusted in dependence upon the sausage caliber dk. To this end, the guide strips can be displaced linearly on an axis in the direction of the center M of the guide strips, which lies on the longitudinal axis L. In the present embodiment, a guide strip 2a, b, c, d is provided with at least one, preferably two holders 14. The respective holder 14 can be displaced linearly through a drive which is not shown. The guide strips are preferably displaced synchronously so as to guarantee an exact positioning of the sausage strand.

Figure 4A:
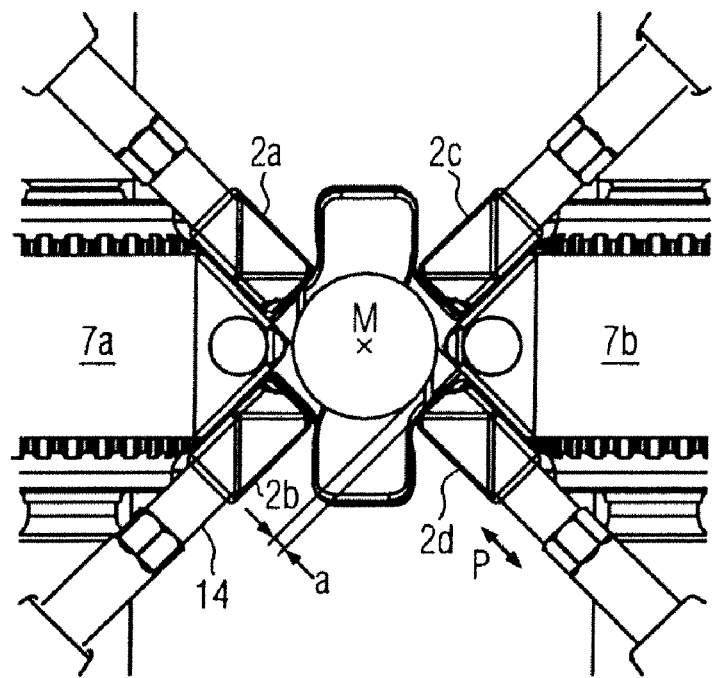
FIG. 4A shows a detail of a front view of the first embodiment for a first sausage caliber dk.

In FIG. 4A it is clearly shown that the holders 14 for the guide strips can be displaced along the arrow P. FIG. 4A shows a first position of the guide strips for a comparatively small sausage caliber dk. For arriving at this position, the guide strips are displaced such that the distance a between a sausage strand arranged at the center M of the guide elements and said guide elements lies within a range of 0.5 to 5 mm, preferably in a range of 0.5 to 2 mm. If said distance a is not large enough, the not yet fully stuffed sausage, which is caused to rotate by the stuffing tube 9, will not be able to co-rotate unhindered, and this will lead to incorrect twist-off locations or to a bursting of the casing. If the distance a is too large, the casing tends to cause, due to its curvature, out-of-balance phenomena during the twist-off process. This may have the effect that the sausage knocks against the guide elements and bursts, or length variations may occur when the sausages swerve to the side.

The adjustable guide strips allow a very large caliber range to be dealt with. An exchange of format parts is here not necessary.

Figure 4B:
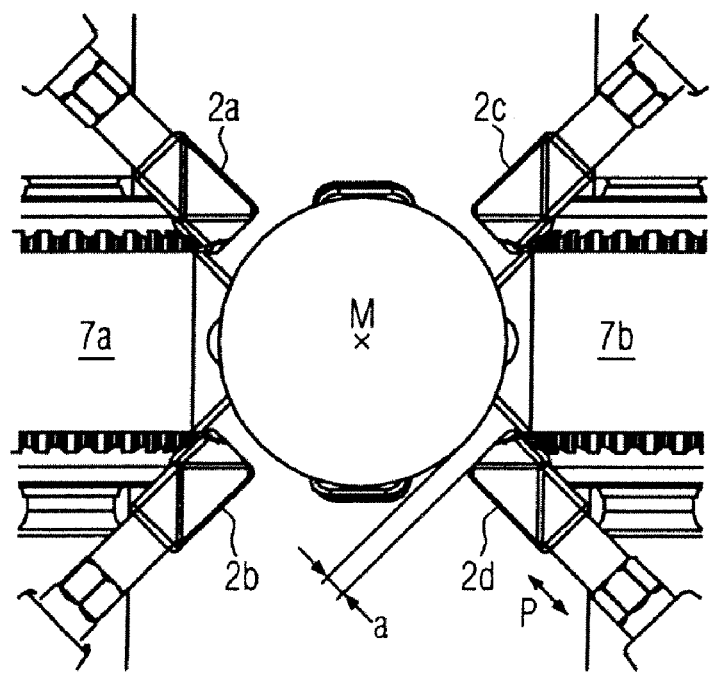
FIG. 4B shows a corresponding detail of a front view of the first embodiment for a second sausage caliber dk.
Figure 5:
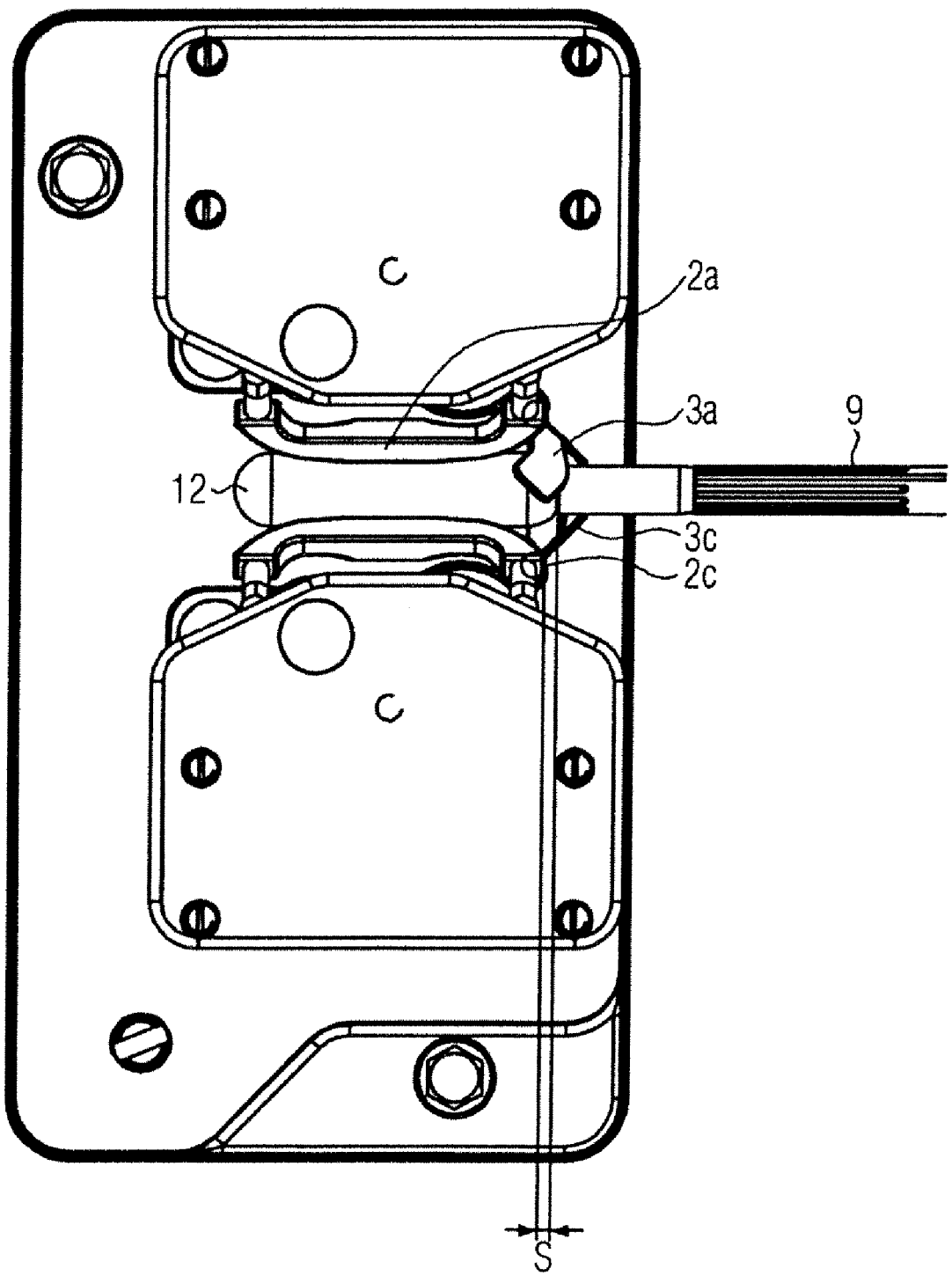
FIG. 5 shows atop view of the first embodiment of the present disclosure.
Figure 6:
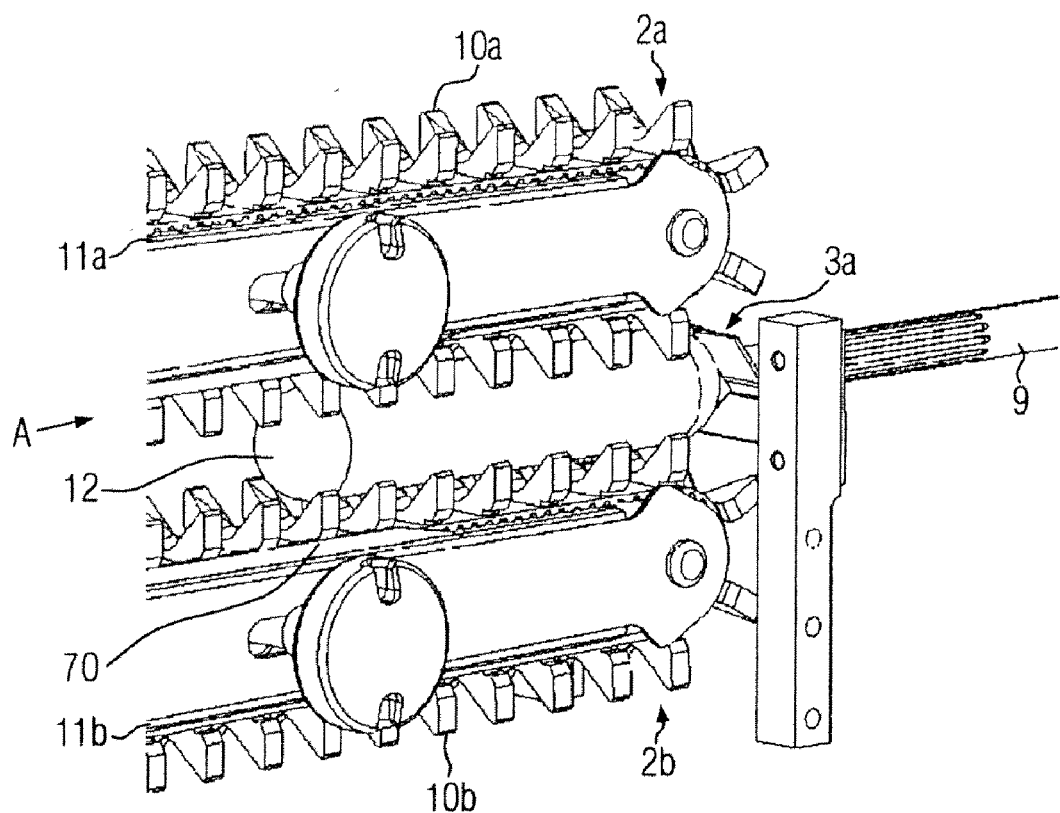
FIG. 6 shows a fragmentary perspective view of a second embodiment according to the present disclosure.
Figure 7:
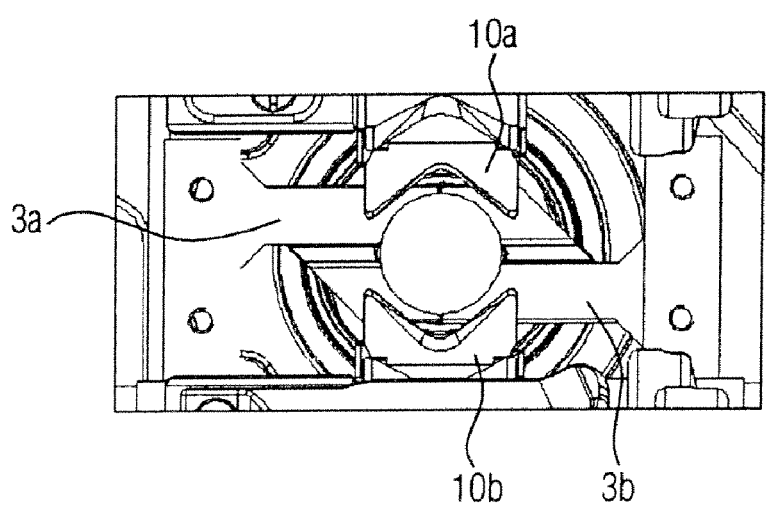
FIG. 7 shows a view of the dogs and of the dividing elements from direction A of the embodiment shown in FIG. 6.

FIG. 4B shows a front view for a larger sausage caliber. The guide strips 2a, b, c, d have here been moved outwards from the center M so that the distance a lies, as has been described hereinbefore, within the range according to the present disclosure.

Hence, it can be guaranteed that various calibers will be guided reliably and gently.

In accordance with this embodiment, the guide elements are preferably oriented such that they extend parallel to one another. The sausages are not caught by the guide elements.

The above-described embodiment is followed by a conveyor unit, e.g. a removal belt used for further processing the product.

In the case of the embodiment shown in FIGS. 2 to 5, the apparatus is provided with a circulating element 7a, b having attached thereto at least one dividing element. If a change in the length of a sausage to be produced is intended, the length of time for which the sausage strand is not in engagement with any dividing element will have to be changed.

Figure 15:
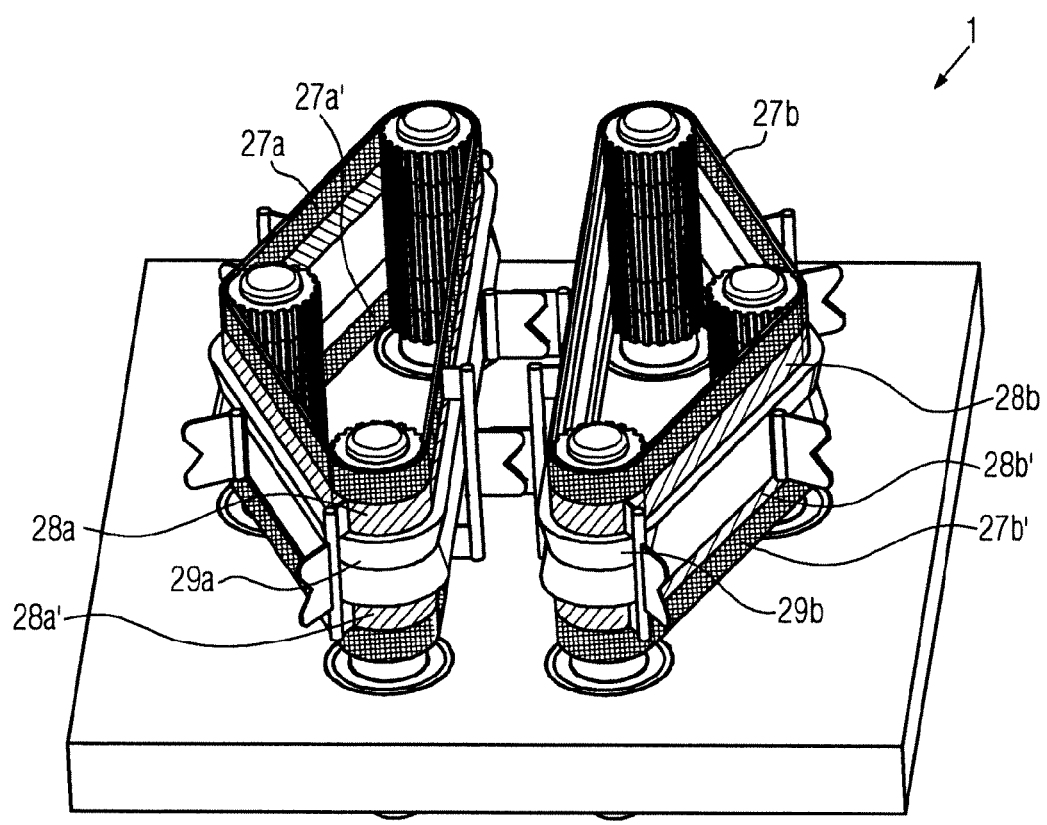
FIG. 15 shows, in a perspective representation, an apparatus for dividing a stuffed sausage strand according to the prior art.

The embodiment shown in FIGS. 1 to 5 is, however, also applicable to a principle in the case of which, as shown in FIG. 15, a plurality of opposed circulating element pairs is provided, said opposed circulating element pairs being adapted to be driven independently of one another and being each provided with at least one pair of dividing elements. In FIG. 15, for example, three element pairs 27 a,b as well as 28 a,b and 29 a,b are provided. The element pairs 27 and 28 consist here of the spaced subelement pairs 27 a,a',b,b' and 28 a,a', b,b' which are spaced apart from one another, but driven identically. Due to the fact that the speed of the various circulating element pairs 27, 28, 29 can be adjusted independently of one another, the distance between successive dividing element pairs or locations of division can be adjusted accurately by changing the speed so that a specific length 1 of the partitioned sausage strand can be adjusted. It is therefore possible to produce different product lengths without any modification of mechanical parts and without complete retooling. The length of the partitioned sausage strand depends here neither on the length nor on the circumference of the circulating element. The function and the composition of this solution is explicitly described in EP 1 902 622. The circulating elements shown in FIG. 15 replace in this embodiment the circulating elements 7a, b, which are shown e.g. in FIGS. 1 to 5.

The apparatus shown in FIGS. 1 to 5 operates as follows:

The distance between the guide elements 2a, b, c, d is adapted to the sausage caliber dk. As has been described hereinbefore, a stuffed sausage strand 12 is produced by the stuffing machine shown in FIG. 1. The sausage strand arrives at the dividing apparatus 1 immediately behind the stuffing tube end of the stuffing tube 9. The circulating dividing elements 3a, b are moved towards one another. When the dividing elements 3a, b engage one another, the paste-like substance in the sausage strand will be displaced at this point thus forming a location of division. The dividing elements 3a, b can interengage, as has been described hereinbefore, or they can slide past one another and constrict the sausage strand in the generally known manner.

When the sausage strand is being engaged, the circulating parts 7a, b are driven via the drive shaft 4 synchronously with the ejection of stuffing material, i.e. the speed with which the paste-like substance is ejected from the stuffing tube, and the conveying speed of the stuffed sausage strand, respectively. The stuffed sausage strand is advanced in the conveying direction T through the movement of the engaging dividing elements 3a, b. The not yet fully stuffed sausage is caused to rotate by the stuffing tube, so that the twist-off point is formed, i.e. jumps in, at the location of division. In view of the ideal adjustment of the distance between the guide elements 2a, b, c, d, the not yet fully stuffed sausage can co-rotate unhindered in the guide means.

FIGS. 6 to 13 show another embodiment according to the present disclosure. Also in this embodiment, the dividing elements 3a, b spatially overlap the guide elements 10a. Just as in the case of the preceding embodiment, the guide elements 2a, b can be adjusted, independently of the dividing elements 3a, b, to the sausage caliber dk. The guide elements comprise here again circulating parts 11a, b, in particular two circulating belts, chains, etc., which run around e.g. two shafts and whose surfaces have arranged thereon dogs, in particular U- or V-shaped dogs, at regular intervals.

In contrast to the preceding embodiments, the guide elements 2a, b are not static, but they are of the co-running type. As can be seen from FIG. 7, the dogs 10a, b of the superimposed guide elements 2a, b enclose the stuffed sausage strand 12 at least partially. The distance between the guide elements 2a, b can be adjusted through an adjusting device, which is not shown. The vertical positions of the guide elements can be adjusted and fixed independently of one another with the aid of a suitable adjusting device. For accomplishing a better adjustment with maintenance of the center axis L, the adjusting device for the two guide elements can be coupled, e.g. by a spindle with right- and left-hand threads or by a pair of meshing gears, each of said gears having secured thereto a guide element.

As can especially be seen from FIGS. 6 to 11, a dividing unit comprising a pair of dividing elements 3a, b is provided in the area constituting the front end area 13 when seen in the conveying direction T. The front end area of the guide elements is the area which is located as close as possible to the stuffing tube. Due to the fact that the dividing elements are disposed between the guide elements and engage the sausage strand between the dogs 10, the apparatus can be positioned as close as possible to the stuffing tube end, and, as has been explained in connection with the first embodiment, this will allow particularly gentle processing.

Figure 11:
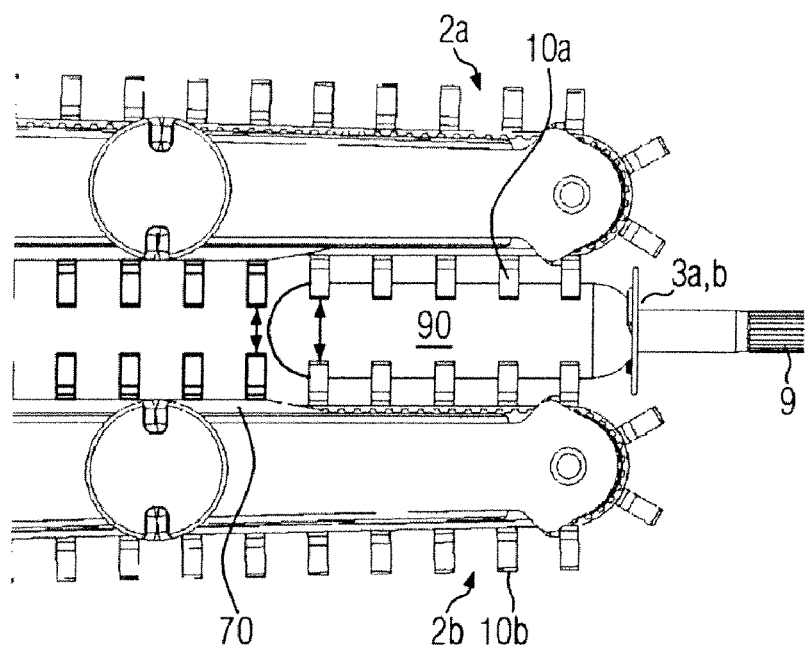
FIG. 11 shows a side view of the second embodiment.
Figure 12:
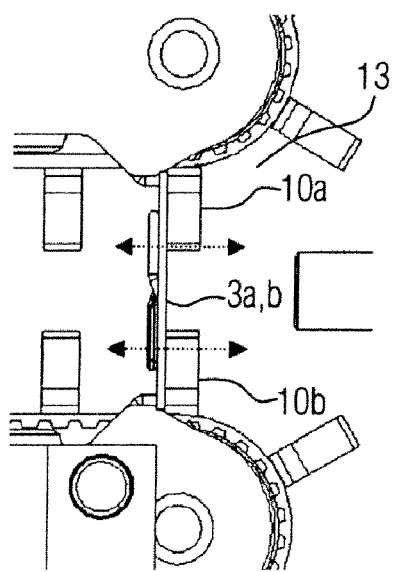
FIG. 12 shows a detail of a side view of a further embodiment with flexible dogs.

Also in this case the dividing element is, in the manner explained hereinbefore, located so close to the stuffing tube that the dividing elements will just be prevented from coming into contact with the stuffing tube, as can especially be seen from FIG. 11.

Figure 9:
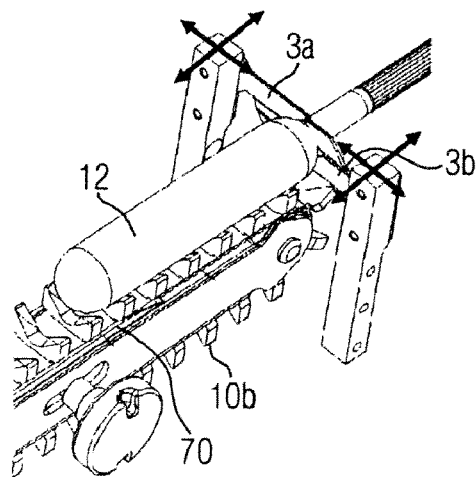
FIG. 9 shows a fragmentary perspective view of the second embodiment and diametrically constricting, parallel co-running dividing elements.

The dividing elements 3a, b provided can be dividing elements which diametrically constrict the sausage caliber, the dividing elements 3a, b moving during the division process from a starting point a certain distance parallel to the sausage strand in the conveying direction and, in so doing, they constrict the sausage strand, withdraw from the sausage strand and return on a closed path to the starting point so as to produce the next location of division. (FIG. 9).

As has been described hereinbefore, the dividing elements can interengage or slide past one another. As can be seen from FIG. 10, the dividing elements 3a, b can also constrict the sausage strand between the dogs 10a, b of the circulating part 11 by rotating about a vertical axis and by engaging one another or sliding past one another at the location of division so as to constrict the sausage strand.

Figure 8:
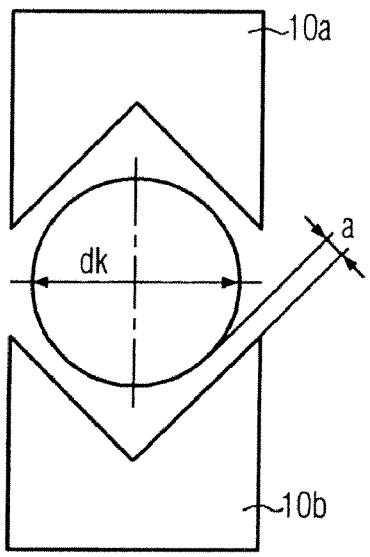
FIG. 8 shows, in a schematic representation, two opposed support elements with a centrically arranged sausage strand.

As has been described hereinbefore and as can especially be seen from FIG. 8, the distance between the guide elements 2a, b, in this case the dogs 10a, b, can be adjusted, by displacing the position of the guide elements 2a, b relative to one another, in such a way that the distance a between a sausage strand arranged at the center M of the guide elements and said guide elements lies within a range of 0.5 to 5 mm, preferably 0.5 to 2 mm, as already been explained in connection with the first embodiment.

When the guide elements 2a, b are here also intended to fulfil an entraining and conveying function, they are—in an area constituting the front area when seen in the conveying direction T and having a length that corresponds approximately at least to the length of the sausage to be produced ±10%—spaced apart in such a way that the sausage strand can rotate freely between the guide elements, said distance decreasing subsequently in such a way that the sausages can be caught and conveyed in the conveying direction T. To this end, the guide elements may e.g. be arranged such that they are not parallel to one another, but extend at an angle to one another, i.e. they can be conically adjustable.

Figure 10:
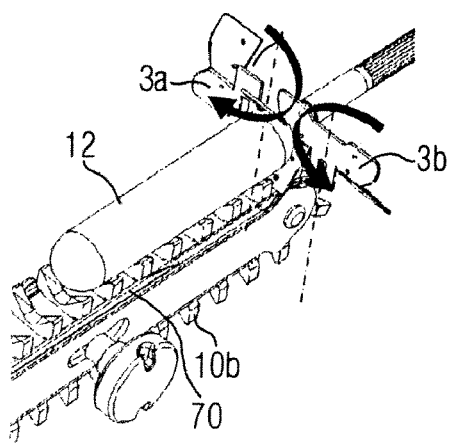
FIG. 10 shows a fragmentary perspective view of the second embodiment with rotatingly constricting dividing elements.

As can especially be seen from FIGS. 9, 10, 11, it is, however, also possible that the circulating parts 11a, b, which are here belts or chains, run in an area after the dividing elements 3a, b over a raised portion 70, so that the distance between the dogs will be reduced and the sausage will be caught. For adapting the length of the front area, in which the sausages to be produced can rotate freely, to different sausage lengths, an axially movable sliding piece can be used as a raised portion.

If the guide elements 2a, b are not driven, the circulating parts will simply move along with the sausages. In this case, a conveying unit, which conveys the sausages in the conveying direction T, will, however, be provided subsequent to the apparatus 1.

The length of the various sausage portions can be adjusted through the speed with which the stuffing material is ejected and the speed of the circulating parts 2a, b driven in synchronism therewith as well as the constriction frequency of the dividing elements 3a, b. The flexibility with respect to the length of the products is therefore independent of the distance between the V- or U-shaped dogs 10a, b on the belt. In order to accomplish a flexibility of the length of the various products, the dogs 10a, b are configured such that they are at least partially flexible, i.e. the dogs 10a, b consist of a flexible, elastic material or at least an upper area thereof, which faces the circulating element 11a, b, consists of a movable, flexible part. Hence, a dog 10a, b that collides with a dividing element 3a, b will be able to give way, as can be seen from FIG. 12.

Figure 13:
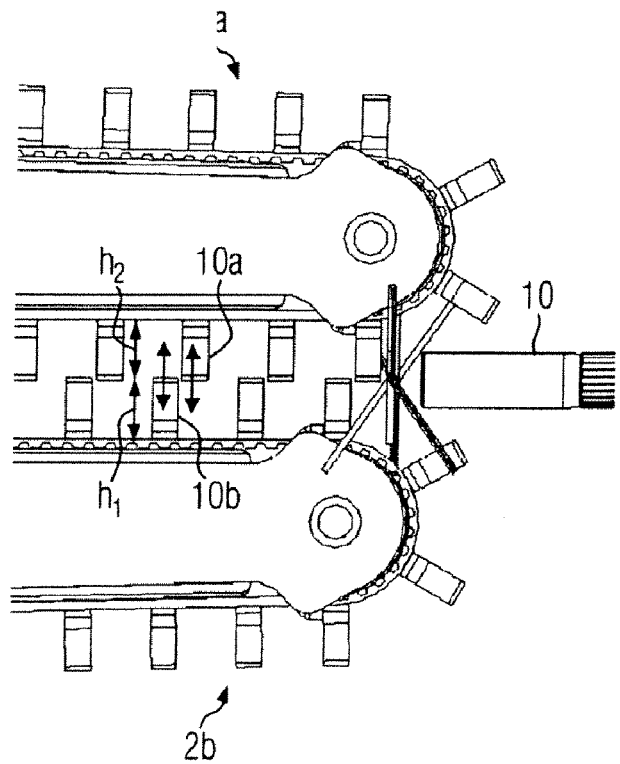
FIG. 13 shows a fragmentary side view according to a further embodiment with dogs that are displaced relative to one another.
Figure 14:
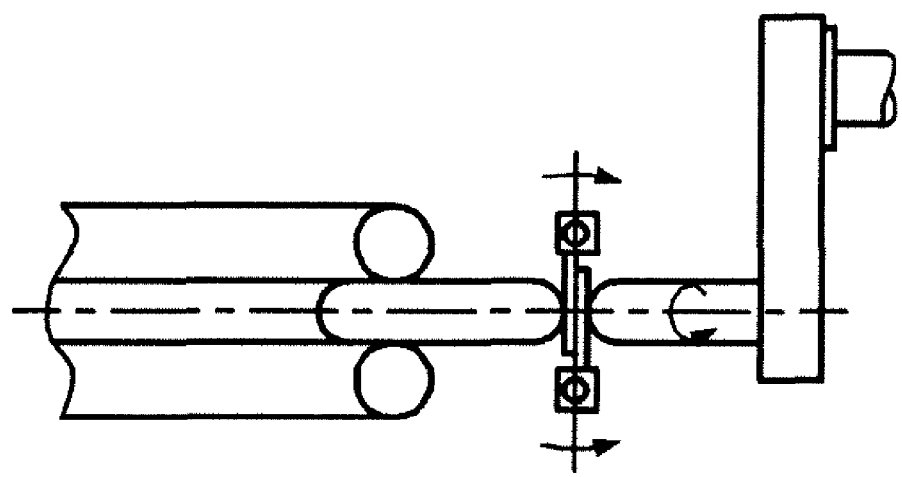
FIG. 14 shows, in a highly schematic representation, an apparatus for dividing a stuffed sausage strand according to the prior art.

In order to enlarge the sausage caliber range still further, it will be of advantage when the dogs 10a, b on the opposed circulating elements 11a, b are arranged such that they are displaced relative to one another in the conveying direction, as can clearly be seen from FIG. 13. It follows that the distance between the surfaces of the circulating parts 11a, b of the guide elements 2a, b can be reduced to a distance that is smaller than the height h1+h2 of the opposed dogs. The adjustable sausage caliber range can essentially be increased in this way.

The method according to the present disclosure executed with the apparatus according to the second embodiment works as follows: the distance of the guide elements 2a, b is adapted to the sausage caliber dk. If necessary, also the axial position of the raised portion 70 is adapted to a specific sausage length. As has been explained in connection with the first embodiment, the sausage strand 12 is produced first by the stuffing machine, which is shown in FIG. 1, and conveyed in the conveying direction T. The circulating parts 11a, b are driven via a drive, which is not shown, preferably synchronously with the ejection speed of the stuffing material. The path of movement of the guide elements, i.e. of the dogs 10a, b, and the path of movement of the dividing elements intersect in this case, i.e. the dividing elements are arranged between the guide elements, and this allows the apparatus to be positioned very close to the stuffing tube and it allows the stuffed sausage casing to be held reliably during the partitioning process. It follows that the stuffed sausage strand is constricted by the movement of the engaging dividing elements 3a, b, and also in this case a twist-off point can be formed, i.e. can jump in, at the location of division, as has been explained hereinbefore. The partitioned sausage is then transported away in the conveying direction T for further processing; in this embodiment, the distance between the dogs 10a, b is preferably reduced further down on the guide elements 2a, b so that the partitioned sausages will be entrained more reliably. In an area constituting the front area when seen in the conveying direction T, i.e. in an area 90 whose length corresponds approximately at least to the length of a sausage to be produced ±10%, the distance between the guide elements must be so large that the sausage strand can rotate freely between the guide elements and that the above-defined distance a between the sausage strand and the guide means is given. Further down in the conveying direction, said distance gradually decreases in such a way that the sausages are caught for the purpose of conveying. The stuffing material is ejected continuously, just as in the case of the first embodiment.

The above-shown embodiments provide an optimally implemented guide means for the sausage strand for a sausage-casing-sensitive production of individual sausages, said guide means being adapted to be adjusted to the sausage caliber. Due to the fact that the dividing elements 3a, b and the guide elements 2a, b, c, d overlap spatially, i.e. the location of division lies between the guide elements, guidance of the sausages can begin as close as possible to the end of the stuffing tube 9. High flexibility with respect to the production of different sausage calibers and also of sausages having different lengths is given. The movement of the dividing elements is independent of possible guide elements.

The invention claimed is:

1. An apparatus for a sausage-casing-sensitive division of stuffed sausage strands, comprising at least one pair of dividing elements for dividing the stuffed sausage strand and at least two guide elements between which the stuffed sausage strand is conveyed in a conveying direction, and the distance between the guide elements can be adjusted in dependence upon a sausage caliber, wherein the movement of the dividing elements is independent of the guide elements, and the guide elements and the dividing elements are arranged in a spatially overlapping manner, wherein the distance between the guide elements is adjustable such that it is larger than the sausage caliber and that the distance between a sausage strand arranged at a center of the guide elements and the guide elements lies in a range of from 0.5 to 5 mm, and wherein the at least two guide elements comprise at least two opposed guide strips which extend in the conveying direction and which are displaceable in the direction of a center of the guide elements, and at least two opposed circulating elements each comprising at least one dividing element, the guide strips being arranged such that the dividing elements are adapted to be moved in the conveying direction between said guide strips without contacting the same.

2. An apparatus according to claim 1, wherein the location of division is produced in an area between the guide elements.

3. An apparatus according to claim 1, wherein the guide elements are arranged at distances less than 10 mm from an ejection end of a stuffing tube such that the dividing elements are just prevented from coming into contact with the stuffing tube.

4. An apparatus according to claim 1, wherein the range is from 0.5 to 2 mm.

5. An apparatus according to claim 1, wherein the opposed guide strips are synchronously displaceable.

6. An apparatus for a sausage-casing-sensitive division of stuffed sausage strands, comprising at least one pair of dividing elements for dividing the stuffed sausage strand and at least two guide elements between which the stuffed sausage strand is conveyed in a conveying direction, and the distance between the guide elements can be adjusted in dependence upon a sausage caliber, wherein the movement of the dividing elements is independent of the guide elements, and the guide elements and the dividing elements are arranged in a spatially overlapping manner, wherein the distance between the guide elements is adjustable such that it is larger than the sausage caliber and that the distance between a sausage strand arranged at a center of the guide elements and the guide elements lies in a range of from 0.5 to 5 mm, wherein the guide elements are implemented as co-running elements moving in the conveying direction, wherein the dividing elements are arranged between the guide elements in an area of said guide elements constituting a front end area when seen in the conveying direction.

7. An apparatus according to claim 6, wherein the guide elements comprise one of V- or U-shaped dogs which are arranged on two opposed circulating parts.

8. An apparatus according to claim 6, wherein dogs are implemented such that they are at least partially flexible.

9. An apparatus according to claim 6, wherein dogs are arranged on opposed circulating parts such that they are displaced relative to one another in the conveying direction.

10. An apparatus according to claim 6, wherein a path of movement of the guide elements and a path of movement of the dividing elements intersect.

11. An apparatus according to claim 6, wherein the guide elements are spaced apart in an area constituting a front area when seen in the conveying direction, the spacing being such that the sausage strand can freely rotate between the guide elements, the spacing decreasing subsequently such that the sausages will be caught and conveyed in the conveying direction.

12. An apparatus according to claim 7, wherein the two opposed circulating parts are one of belts and chains.

13. A method of dividing stuffed sausage strands, comprising stuffing the sausage strand via a stuffing tube, and dividing the strand then through dividing elements while guiding the strand by means of at least two guide elements, conveying the stuffed sausage strand in a conveying direction, and twisting the strand off by rotating the stuffing tube about its longitudinal axis, whereby a twist-off point will be formed at the location of division, and adjusting the distance between the guide elements in dependence upon a sausage caliber, the distance between the guide elements being adjustable such that it is larger than the sausage caliber and such that the distance between a sausage strand arranged at a center of the guide elements and the guide elements lies in a range of from 0.5 to 5 mm, wherein the movement of the dividing elements is independent of the guide elements, and the guide elements and the dividing elements are arranged in a spatially overlapping manner, wherein in guiding the strand by means of at least two guide elements, the at least two guide elements comprise at least two opposed guide strips which extend in the conveying direction and which are displaceable in the direction of a center of the guide elements, and moving the dividing elements in a conveying direction between the guide strips without contacting the guide strips and wherein in dividing the strand through dividing elements, each of the dividing elements is part of one of at least two opposed circulating elements.

14. A method of dividing stuffed sausage strands, comprising stuffing the sausage strand via a stuffing tube, and dividing the strand then through dividing elements while guiding the strand by means of at least two guide elements, conveying the stuffed sausage strand in a conveying direction, and twisting the strand off by rotating the stuffing tube about its longitudinal axis, whereby a twist-off point will be formed at the location of division, and adjusting the distance between the guide elements in dependence upon a sausage caliber, the distance between the guide elements being adjustable such that it is larger than the sausage caliber and such that the distance between a sausage strand arranged at a center of the guide elements and the guide elements lies in a range of from 0.5 to 5 mm, wherein the movement of the dividing elements is independent of the guide elements, and the guide elements and the dividing elements are arranged in a spatially overlapping manner, each of the guide elements being co-running elements moving in the conveying direction, and wherein in dividing the strand then through dividing elements, the dividing elements are arranged between the guide elements in an area of said guide elements constituting the front end area when seen in the conveying direction.

\* \* \* \* \*